US005970254A

United States Patent [19]
Cooke et al.

[11] Patent Number: 5,970,254
[45] Date of Patent: Oct. 19, 1999

[54] INTEGRATED PROCESSOR AND PROGRAMMABLE DATA PATH CHIP FOR RECONFIGURABLE COMPUTING

[76] Inventors: Laurence H. Cooke, 25399 Spanish Ranch Rd., Los Gatos, Calif. 95030; Christopher E. Phillips, 5888 Assis Ct., San Jose, Calif. 95138; Dale Wong, 855 35th Ave., San Francisco, Calif. 94121

[21] Appl. No.: 08/884,380

[22] Filed: Jun. 27, 1997

[51] Int. Cl.⁶ .................................................. G06F 15/76
[52] U.S. Cl. ................. 395/800.37; 395/800.01
[58] Field of Search .................. 395/800.01, 800.37, 395/800.36

[56] References Cited

U.S. PATENT DOCUMENTS

| | | | |
|---|---|---|---|
| 5,535,342 | 7/1996 | Taylor | 395/307 |
| 5,535,406 | 7/1996 | Kolchinsky | 395/800.1 |
| 5,585,749 | 12/1996 | Tredennick | 361/790 |
| 5,748,979 | 5/1998 | Trimberger | 395/800.37 |
| 5,752,006 | 5/1998 | Baxter | 395/500 |

*Primary Examiner*—Eric Coleman
*Attorney, Agent, or Firm*—Burns, Doane, Swecker & Mathis LLP

[57] ABSTRACT

A reconfigurable processor chip has a mixture of reconfigurable arithmetic cells and logic cells for higher effective utilization than a standard FPGA. The reconfigurable processor includes a standard microprocessor such as an embedded RISC processor. Many different types of interfaces are used to interface between the embedded processor and the reconfigurable portions of the chip, thus allowing for the fastest interface between standard processor code and configurable "hard-wired" functions. A configuration memory stack is provided, allowing for nearly instantaneous reconfiguration. if desired, configuration planes can be shared between ALU function configuration and bus interconnect configuration, allowing more efficient use of stack memory.

11 Claims, 5 Drawing Sheets

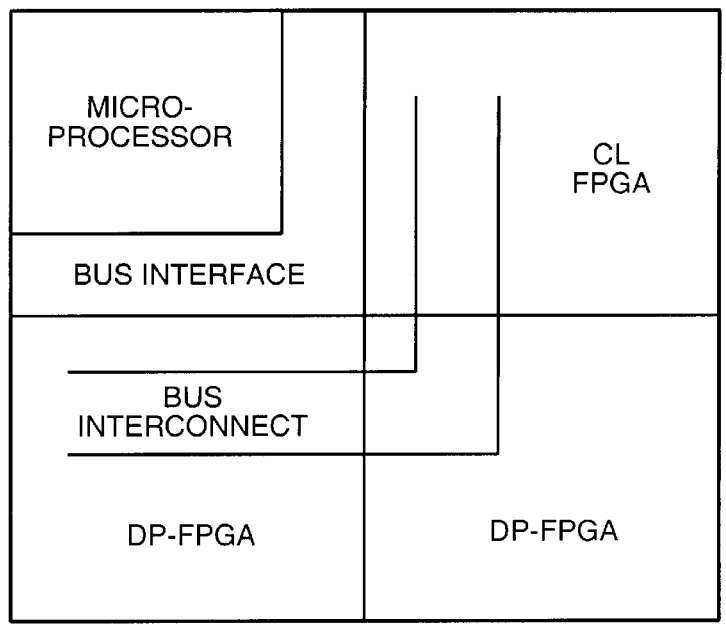
FIG._1
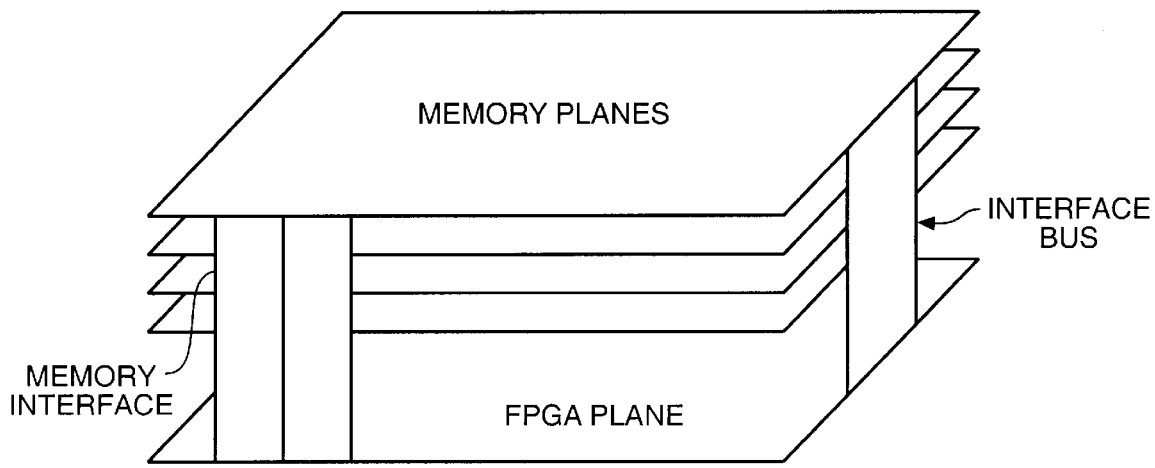
FIG._2
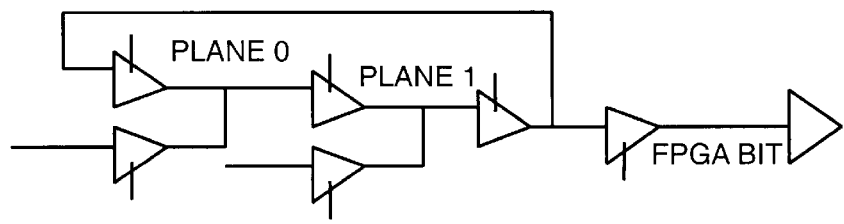
FIG._3 *(PRIOR ART)*

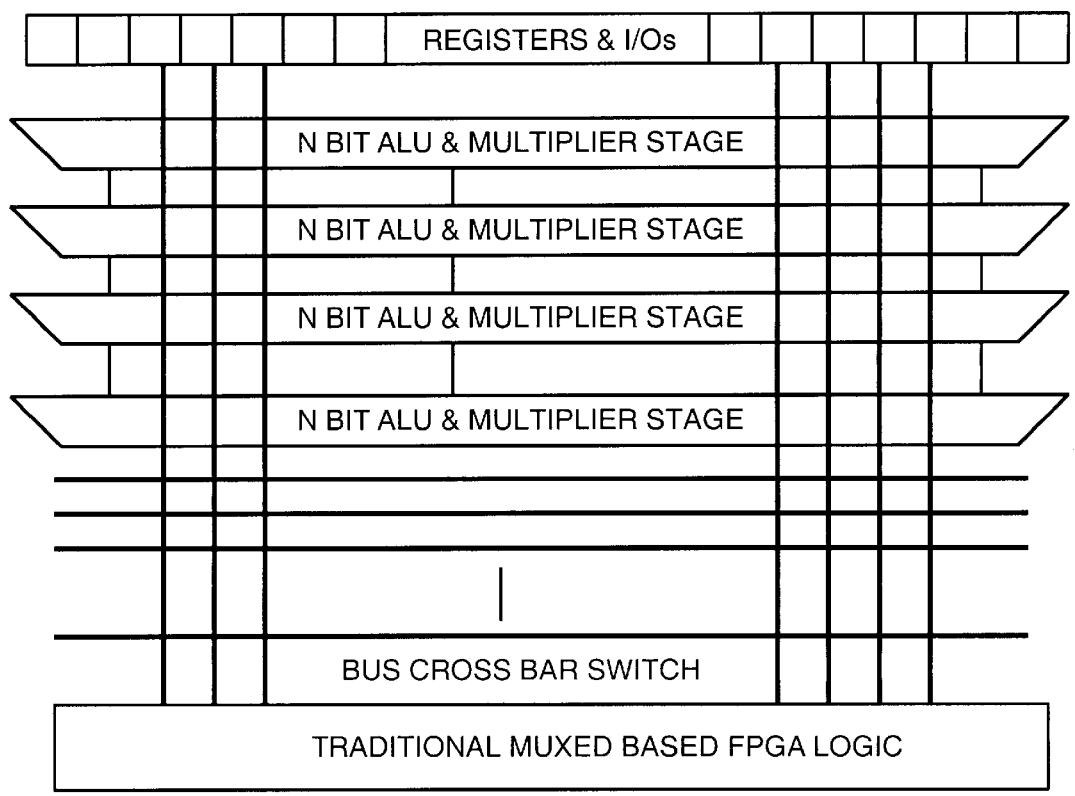
FIG._4
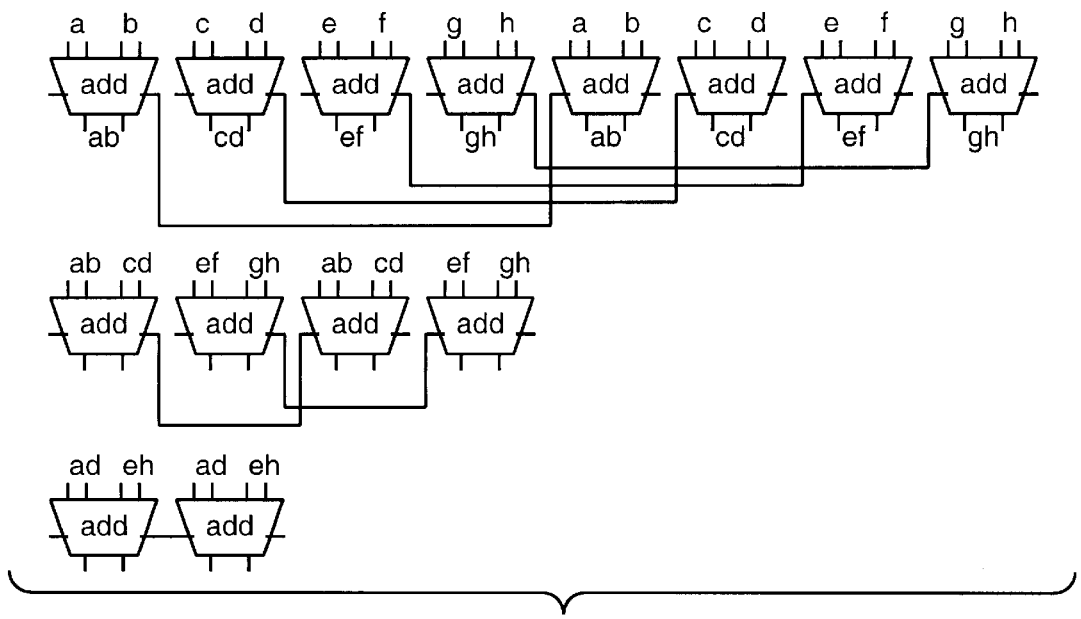
FIG._5

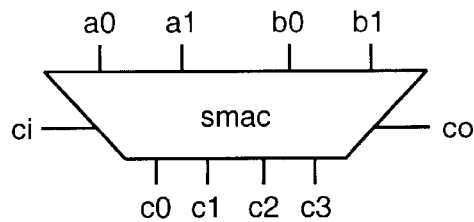
FIG._6
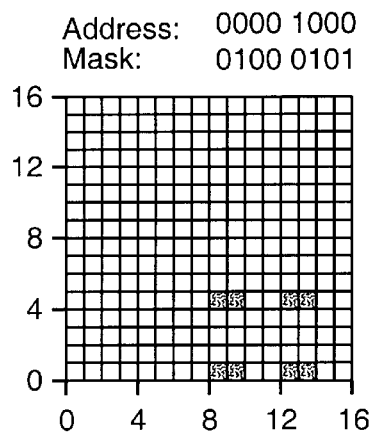
FIG._7A
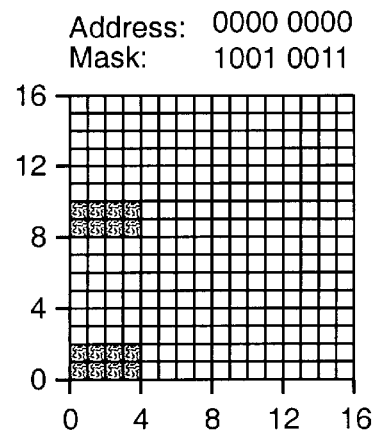
FIG._7B
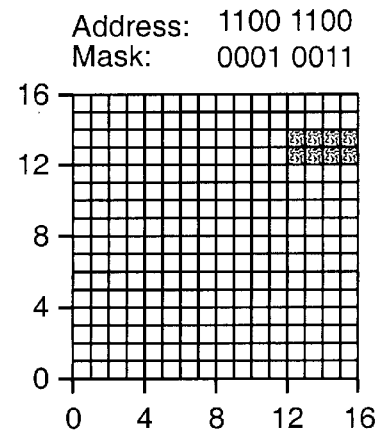
FIG._7C
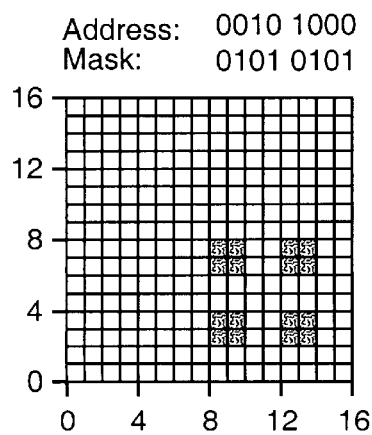
FIG._7D
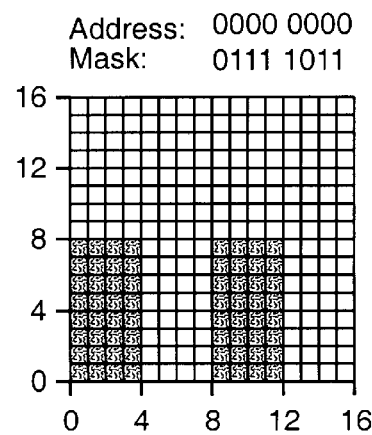
FIG._7E
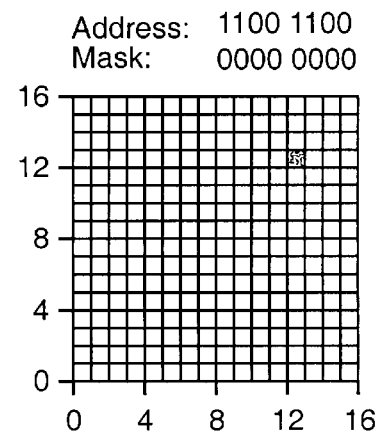
FIG._7F

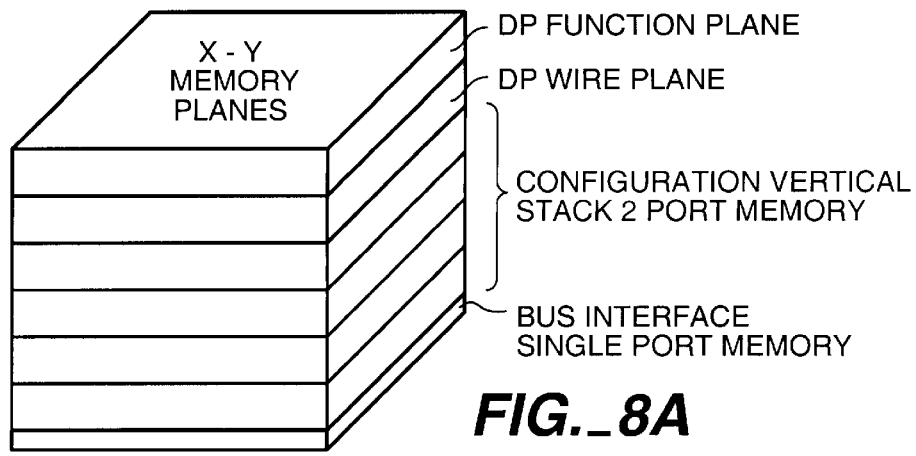
FIG._8A
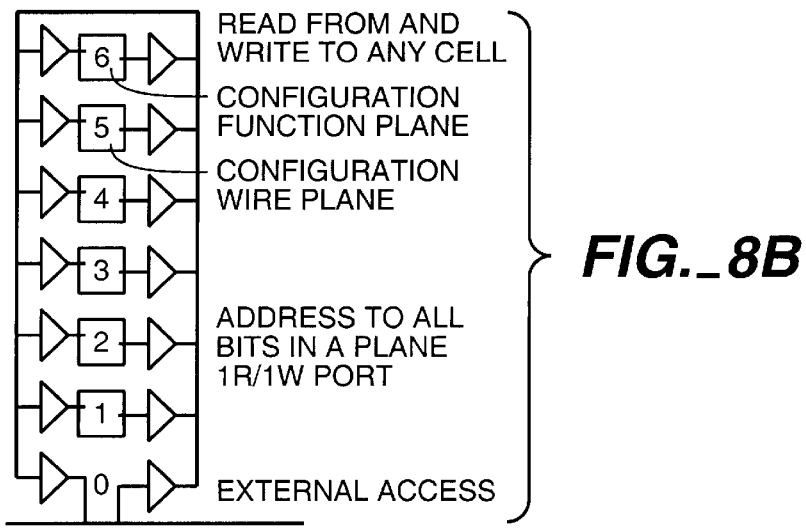
FIG._8B
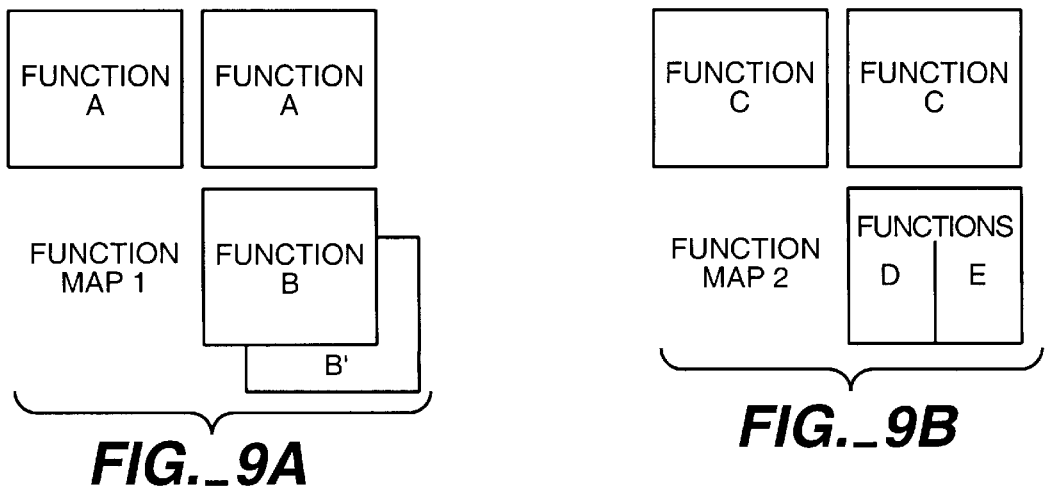
FIG._9A
FIG._9B

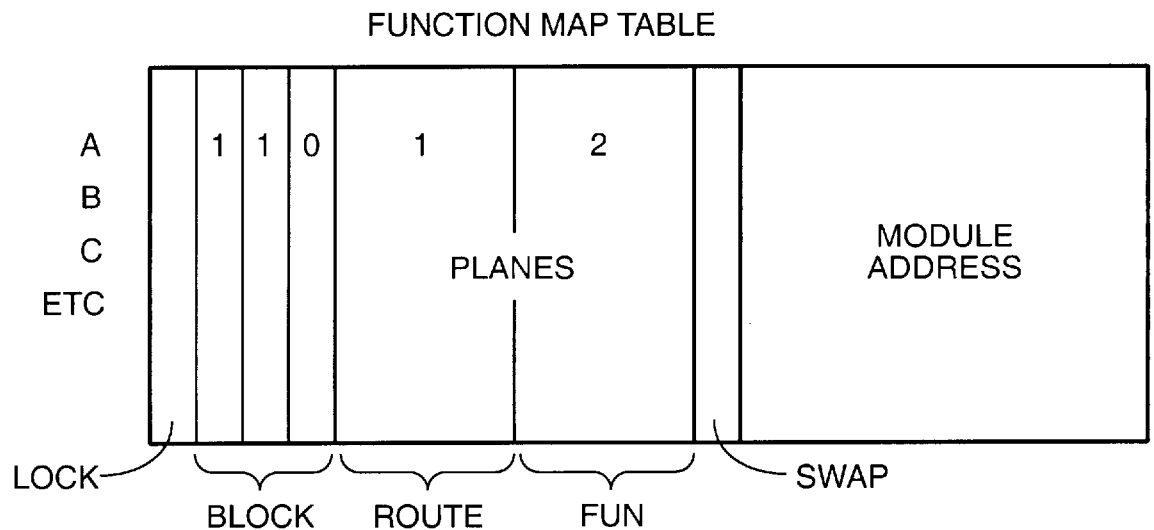
FIG._10A
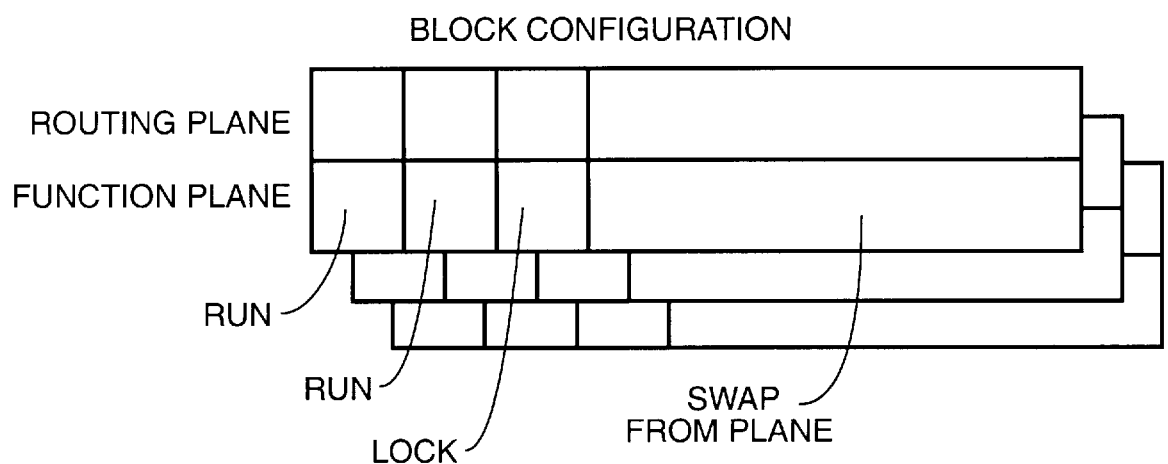
FIG._10B

INTEGRATED PROCESSOR AND PROGRAMMABLE DATA PATH CHIP FOR RECONFIGURABLE COMPUTING

FIELD OF THE INVENTION

Microprocessor Chip with programmable logic and Software Tools for reconfiguring it.

BACKGROUND AND SUMMARY OF THE INVENTION

As the cost of increasingly complex integrated circuits continues to fall, systems companies are increasingly embedding RISC processors in their non-computer systems. As a result, most of their development is now in software, where it used to be in hardware design. Today whole applications, such as modems, digital vidio decompression, and digital telephony can be done in software, if the processor has enough performance. Software development also has the advantage of flexability and a faster time to market, which is required to offset the decreasing life cycles of today's electronic products. Unfortunately, software is much slower than hardware, and as a result requires very expensive high end processors to meet the computational requirements of some of these applications. Field Programmable Gate Arrays or FPGAs have also been increasingly used because they offer greater flexability and shorter development cycles than traditional ASICs, while providing most of the performance advantages of a dedicated hardware solution. This explains why companies which have been providing field programmable or embedded processor solutions have been growing so fast.

It has long been known in the software industry, that any application has most of its computation time spent in a small section of code. A general trend in the industry has been to build software applications, standardize the interfaces to these computationaly intensive sections of code, and eventually turn them into dedicated hardware. A large number of companies are doing just that; providing chips that do everying from video graphics accelleration to MPEG digital video decompression. The problem is these dedicated chips generally take a number of years to create, and then are only good for their specific tasks. As a result, a number of companies have started to provide complex digital signal processing chips, or DSPs, which can be programed to do some of these tasks. They are more flexable than hardware, but less flexable than standard processors for writing software.

The logical extension of these trends is to create a chip which is a processor with dedicated hardware that replaces the computationally intensive sections of the application code. In fact most complex MPEG chips already have dedicated embedded processors in them, but they are not very flexable. To provide the flexability the dedicated hardware must be like an FPGA where the computationally intensive sections of the application code can be translated to hardware and loaded into the FPGA. Unfortunately, FPGAs are 5–10% as dense as Gate Arrays per useable function. Since there are usually many different sections of computational intensive code that must excuted at different times within any given application, a more efficient way of using the inherently inefficient FPGA logic is to repeatedly load each specific hardware logic function as it is needed, and then replace it with the next function. A number of researchers in Universities and FPGA companies such as Xilinx have been developing ways to do this in FPGAs. They call this reconfigurable computing. What has not been done is the combination of a standard processor and this type of reconfigurable FPGA on a single chip.

In this patent we will describe a system comprised of a chip which contains both a standard processor, blocks of special FPGA logic, and unique interfaces between them that enables the correponding software tools to recompile the application code into a combination of software and reloadable hardware blocks. This capability will provide the customer the flexability of software development, with the performance of dedicated hardware solutions, while using our relatively inexpensive reconfigurable processor chips.

BRIEF DESCRIPTION OF DRAWINGS

FIG. 1 shows the basic system.

FIG. 2 shows the relationship between the memory planes that are used to configure the FPGA planes and the FPGA plane itself.

FIG. 3 shows a prior art embodiment of the memory planes, at a single bit level.

FIG. 4 is a high level diagram of the DP-FPGA and the CL-FPGA structures and their bus interconnections.

FIG. 5 is an example of a configuration of the DP-FPGA structures.

FIG. 6 is one embodyment of the basic arithmetic cell for the DP-FPGA sections.

FIGS. 7a–7f show the mapping of specific address and masks in the example 4×4 bit address space.

FIGS. 8a & 8b describe the shared memory stack used to configure the DP-FPGA.

FIGS. 9a and 9b illustrate different function maps for the present reconfigurable processor chip.

FIGS. 10a and 10b illustrate memory structures used to perform dynamic reconfiguration.

DESCRIPTION OF PREFERRED EMBODIMENTS

In the preferred embodiment of the invention, as shown in FIG. 1, there are four quadrants within the chip. Three are FPGA blocks and one is a 32 bit Microprocessor. The three FPGA quadrants are loaded via the bus interface. There are bus lines that run between the three FPGA quadrants. They are connected to logic in the FPGA via tristate buffers. Bus interface logic connects each FPGA section to the interface. Each FPGA has two or more memory planes which can shift into the FPGA function in a single cycle, as shown in FIG. 2. During the change all of that FPGA's bus interfaces are turned off. The the memory planes not being used for configuration, may be used as memory (with a special line to disconnect the IOs). Each of the three planes has a specific memory address space above the external memory space, and can be loaded from the external memory via the memory interface as shown in FIG. 2. In one such prior art embodiment of the memory planes, as shown in FIG. 3, requires less logic but limits the planes to serial execution, and does not allow for sharing of memory planes. There are two separate programming planes for: the FPGA control logic (CL FPGA), and the busses, and ALUs (DP-FPGA) combined. These may be interconnected as shown in FIG. 4. In this case there are R rows of bit maskable, variable sized ALUs along with a logic stage of a multiplier. The W bit wide ALU can be broken into W/k k bit wide ALUs or any combination in between. There are registers in each ALU, any of which may be bypassed. There are local interconnections between the rows and global bus lines, at least 1 for each bit in the row, or at least 4W/k bus lines (2 inputs and 2 outputs). The buses connect to both the inputs and the outputs of each row. There are at least 2W/k cross bar connections, which connect to each of the busses (input and output). There is also some mux based fpga logic which has access to all the cycle by cycle results of the ALUs and controls the programming planes. There are local connections between each row, that connect to the next row, straight, shift right 1 bit, left k bits, 2*k bits, 4*k bits . . . to W bits, for the data output to the data inputs, and the carry bit shifts to the same k bits log W/k times. This allows for interleaving as many sums as necessary to fill each row as be seen in FIG. 5.

The FPGA control logic is selected externally, by the microprocessor, while the other two have multiple planes of control memory, any of which can be addressed by the FPGA control logic as well as externally. There are 8 or more planes for the crossbar matrix and the ALUs combined, as shown in FIG. 8a. To address the memory there are N address bits broken into N/2 groups, for an X/Y coordinate of wire and function. The data width of the memory is equivalent to the configuration requirements for one smac cell. Each plane of the memory is addressed by two separate decodes, one for read and one for write, as shown in FIG. 8b. The main address selects which stack, while one plane address must select address. In FIG. 8b a read from plane 0 and a write to plane 1, loads plane 1 with external data, while the reverse reads from plane 1 to the outside. In the example in FIG. 8a, plane 5 directly drives the plane for wire configuration, while plane 6 directly drives the smac confiiguration plane. With this structure a the same queue can be used for wiring or function configuration, thus allowing a trade-off between the number of loadable planes for function or wiring. Note that like register 0 the same technique can be used as an access into the stack from the logic itself. The ALUs and multiplier logic has a bit mask to block off carry bits between two adjacent bits, thus allowing any number of logic functions at k multiples of width. One such cell structure might look like FIG. 6. It would contain a 2 bit nop, and, or, xor, not, inc, add, multiply, swap, rotate and shift capability as follows:

| Code | Name | Code | Name | Code | Name | Code | Name |
|------|------|------|------|------|------|------|------|
| 0000 | nop, | 0010 | And, | 0100 | Or, | 0110 | Xor, |
| 1000 | swap, | 1010 | rot1, | 1100 | rot2, | 1110 | rot3, |
| 0001 | sub, | 0011 | mul, | 0101 | inc, | 0111 | add, |
| 1001 | Shft4 | 1011 | shft1 | 1101 | shft2 | 1111 | shft3 |

Note, the least order bit signifies a carry or not, hence the mul instruction may increment as well, if the Cin bit is 1. Similarly, the inc instruction must have a 1 for Cin in order to incrament, which it does on A and B together as a 4 bit number. Sub must have carry set at 1 in order to subtract. The Nop instruction passes A and B into the output higher and lower bits. The Swap instruction passes B and A to the output higher and lower bits respectively. The shift and rotate instructions work on all 4 input bits, rather than 2.

So the function itself is defined by a 4 bit code. There are 2 bits for determining if the outputs are registered (high and low two bits), and 2 bits for selecting the clock for a total of 8. The carry-in select requires N+1 selects where N=log (W/k) plus constant 0 and 1, or N+3. The input selection is selecting from the N+1 left options, plus straight and right for N+3 options for each 2 bits from high and low outputs or 2*(N+3). For an array with W=128 bits wide and k=2 bits as above. N=6, so the select is out of 9 or 4 bits address for carry-in and 18 or 5 bits address for the inputs for a total of 14 bits so the total for both is 22 bits to define the smac cell in this array. The total bits per bus plane is 64*7*22=9,856.

The number of rows R must be able to hold the smallest arithmetic cascade as possible so it must be R>log(W/k). There must be at least 4 bits to select the bus line outputs and inputs, two bits at a time, per Smac cell and and 2W/2 for a triangular crossbar switch. This means that for W=128, and if minimum R=6 then set R=7, so the number of bus bits=W*W/k+4*R*W/k=128*64+4*7*64=9,984 bits per bus wire plane. As can be seen by the choice of W and R the number of bits for each plane is almost equal for function as well as wiring. Since there are such a large number of bits per configuration it is necessary to define a way of reducing the load time by compressing the data to be loaded into each configuration plane. Memory planes are 18 bits words, to match the bit requirements for each smac cell, with an address matrix that is N/2×N/2 bits, where 2**N is the address space. Each address decoder has a mask address that considers the mask bits that are on to address all combinations of that bit. There are 6 simplified 4×4 bit matrix examples shown in FIGS. 7a–7f. As can be seen in FIGS. 7a–7f 1, 2 or 4 separate groups of various sizes can be loaded with the 18 bit code in one cycle. In general up to N*N/4 groups can be loaded at one time. An uncompressed FPGA map would have a mask of 0, as can be seen in FIG. 7c. A compression program would be run on the FPGA map which will find the commonly repeating structures and write them simultanously. This will cut the size of the data file, and corresponding load time down significantly, since most of the like datapath elements will be repeating both horizontally and vertically.

The microprocessor has the following interfaces into the FPGA logic:
1)Via the system bus
2)Via the co-processor bus
3)Via the special instruction interface
4) Via special registers In case (1) the FPGA memory or logic planes can be accessed by writing or reading from the above address space via the system bus. This appears as if it were a regular memory access. In case (2) there exists within the Risc architecture special instructions for loading the coprocessor registers and turning control over the the co-processor. The co-processor signals when it is complete and the processor can load the contents of the co-processor interface registers back into the processor. In case (3) there exists an interface off of the internal processor bus. Four special register-register or register-memory instructions cause the two words to be loaded into a register at the boundry of the bus. In addition a signal for stalling the same instruction or all special instructions is provided. The results of the operation are placed within a set of special instruction registers. Any request to read the contents of a special instruction register before the stall for those registers has been cleared stalls that read instruction. And last, in case (4) the co-processor or special instruction registers may be read or written by either the processor or the FPGA logic. An ofset clock from the processor is also provided to guarentee alternating read-write cycle operation if the FPGA can keep up with the processor.

In one embodiment, the microprocessor is a standard risc architecture with four co-processor and four special instructions to interface with the FPGA. If the instructions are not used then the FPGA programming automatically adds the default tie off conditions.

Amoung the special instructions within the processor there are three specific types: 1) Load instructions which will load a plane within a block, 2) Invoke instructions which will transfer the contents of a plane to the configuration plane (routine or function), and 3) Execute instructions which can be in any of the four cases to interface to the FPGA as specified above. More than one function can be mapped on to a plane within a block or a single function can take up more than one block or plane. Because of this, the ability to swap planes is available to the FPGA blocks as well as the processor. FIGS. 9a and 9b show such possible configurations. Note that when a function is contained on two or more planes it is actually multiple interlinked as shown by B' in FIG. 9a. This is possible because the FPGA logic can invoke a function, and the register contents of any plane may be preserved when the routing and function configurations are changed. Conversely, there exists a mechanism for reading and writing the register contents from the FPGA as well. This allows the swapping of the entire operation out and back in, thus allowing one function to be overlaid by another without losing the first function's contents. The software described below will optimally place the load and invoke instructions within the code stream so as to minimize stalls within the process, but the hardware must automatically trap invalid conditions in order to allow the processor to load and invoke the proper plane, and prohibit the processor from invoking a plane on top of a locked and executing process, unless the process is swappable or is expected to automatically abort if another execution is issued. To do the following commands the initialization of any process includes the loading of the function map table shown in FIG. 10a, with the function's module addresses so the load can occur. The operations performed when the three instructions are executed are as follows: The command: Load function, planes; does the following: A function table such as is shown in FIG. 10a provides the module address for the function. The module address is the address in main memory of the blocks, in compressed format to be loaded. This data also contains the function numbers contained within the module along with the swap and block bits. This instruction issues a soft interrupt which is handled by the mini operating system in a manner similar to a supervisor call. The old functions in the table are cleared for the target planes and the planes are loaded via move instructions which use DMA transfers, in a manner similar to an interrupt driven I/O operation. While the DMA transfers are occurring the processor returns to execute it's normal instruction stream. The interrupt completing the transfer of the planes will reenter the "driver" code which will update the function map table shown in FIG. 10a. If the function is already loaded then the instruction returns without loading. If the module address does not exist then the operation aborts with an error exception.

The Execute function; instruction does the following: This instruction will be decoded by the control logic interface to the FPGA Either the function is resident, in which case it is executed with run set to 1 on the appropriate planes and blocks, or it is not in which case a soft interupt is executed which branches the processor into an exception handling routine with the return address at the execute command, thus allowing the instruction to be reissued when it is loaded.

The exception handling routine issues one or more invoke commands with the appropriate parameters, after determining if the current functions are locked or swappable as specified in the appropriate block configuration bits. If the blocks are currently executing another function run is set to 1. If the swap bit is 1 then the function is swappable. If the lock bit is set to 1 then the current plane is locked. Given this the execption routine does the following:

Get the data from the function map table for the function
If the function map blocks are all 0 then
   If the module address is valid then
     Load module address
   else incrament instruction register and return end if
For each block and plane to be used do
   Or the run, lock and swap bits from the appropriate block configuration words end
If run=1 then
   If lock=1 then
     incrament the instruction register (skip the execute instruction)
     return
   else If swap=1 then
     invoke out the executing function
   end if
end if
invoke the new function
update the block configuration words
return This has the effect of reexecuting the instruction after it has been loaded or swapped in, or skipping the instruction. Note that if the currently executing function is not locked or swappable it is aborted.

Upon completion of the execute instruction, when the results are returned to the processor by any of the four mechanisms mentioned above, the run bits are cleared. The, Invoke from plane, to plane; instruction copies the contents of one plane to another.

The result of this approach is to allow the software to improve the run time by early loading and invoking of the functions, while always executing the functions, if at all possible, whether they have been previously loaded or not.

SUMMARY

The above invention will provide a lower cost, higher performance solution than pure processors because:

It has a mixture of arithmetic cells and logic cells for higher effective utilization of the silicon than a standard FPGA, It can share configuration planes between ALU function and bus interconnect, thus allowing more efficient use of configuration stack memory, since different converted code requires more or less of one and less or more of the other, It uses many different types of interfaces with the embedded processor, thus allowing for the fastest interface between standard processor code and the configurable "hard-wired" functions.

All of which will provide customers with a lower cost solution than standard processors alone.

We claim:

1. An integrated circuit comprising:
   a first module which includes a microprocessor;
   a second module which includes configurable logic functions and associated memory to define multiple configuratins of the logic functions; and
   a third module which includes configurable functions and associated memory to define multiple configurations of the arithmetic functions;
   and wires between said modules for communication and configuration.

2. An integrated circuit as in 1 wherein some of the wires between said modules for communication and configuration comprise a bus connected to the microprocessor, the configurable arithmetic functions and associated memory, the configurable logic functions and associated memory, an external bus controller such as PCI and an external general purpose memory controller.

3. An integrated circuit as in 1 including a set of instructions within the microprocessor which will load a configuration from external memory.

4. An integrated circuit as in 1 including a set of instructiions within the microprocessor which will switch between configurations within the configurable modules.

5. An integrated circuit as in 1 including a set of instructiions within the microprocessor which will pass data and controll between the configurable modules and the microprocessor.

6. An integrated circuit as in 3, and a means for loading the said memory within the configurable modules such that the data needed to completely configure the module is much smaller than the said memory.

7. An integrated circuit as in 6 wherein the memory is comprised of data words whose length is equivalent to each cell's configuration requirements;

an addressing structure which allows multiple groups of words to be loaded simultaneously with equivalent configuration data;

a memory addressing structure to load a configuration from external memory switch between configurations within the configurable modules, and pass data to and from the configurable modules.

8. An integrated circuit as in 1 wherein some of the wires between said modules for communication and configuration include connections between the configurable arithmetic functions associated memory and the configurable logic functions.

9. An integrated circuit as in 1 wherein the memories to define multiple configurations of either logic and arithmetic functions are structured to allow the transfer of the entire contents of one plane to any other plane in one clock cycle.

10. An integrated circuit as in 5 where in special instructions include an external load of a configuration memory's plane.

11. An integrated circuit as in 10 which also contains one or more execute instructions which will load, and transfer the function to the proper configuration plane, if necessary, and correctly execute the function.

* * * * *